US012586394B2

(12) United States Patent
Zhou

(10) Patent No.: US 12,586,394 B2
(45) Date of Patent: Mar. 24, 2026

(54) METHOD, APPARATUS AND SYSTEM FOR AUTO-LABELING

(71) Applicant: Harman International Industries, Incorporated, Stamford, CT (US)

(72) Inventor: Rengao Zhou, Shanghai (CN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 222 days.

(21) Appl. No.: 18/547,138

(22) PCT Filed: Mar. 26, 2021

(86) PCT No.: PCT/CN2021/083234
§ 371 (c)(1),
(2) Date: Aug. 18, 2023

(87) PCT Pub. No.: WO2022/198631
PCT Pub. Date: Sep. 29, 2022

(65) Prior Publication Data
US 2024/0153291 A1     May 9, 2024

(51) Int. Cl.
*G06V 20/70* (2022.01)
*G06T 7/20* (2017.01)
(Continued)

(52) U.S. Cl.
CPC ................ *G06V 20/70* (2022.01); *G06T 7/20* (2013.01); *G06V 10/25* (2022.01); *G06V 10/60* (2022.01)

(58) Field of Classification Search
CPC ...... G06V 20/64; G06V 10/774; G06V 10/25; G06V 20/70; G06V 10/82; G06V 10/60; G06V 2201/12; G06T 7/593; G06T 7/20
See application file for complete search history.

(56) References Cited

U.S. PATENT DOCUMENTS 9,424,461 B1      8/2016 Yuan et al.
11,126,854 B1*   9/2021 Olgiati ................. G06V 10/764
(Continued)

FOREIGN PATENT DOCUMENTS

CN        112001973 A      11/2020
CN        112396562 A       2/2021
KR     20180119476 A      11/2018

OTHER PUBLICATIONS

Chen, G. et al., "Event-Based Neuromorphic Vision for Autonomous Driving: A Paradigm Shift for Bio-Inspired Visual Sensing and Perception," IEEE Signal Processing Magazine, vol. 37, No. 4, Jul. 2020, 16 pages.
(Continued)

*Primary Examiner* — Syed Haider
(74) *Attorney, Agent, or Firm* — McCoy Russell LLP

(57)     ABSTRACT

The disclosure provides a method, a system and an apparatus for auto-labeling dynamic vision sensor (DVS) frame. The method may comprise generating a pair of camera frames by a pair of cameras within an interval, and generating at least one DVS frame by a DVS within the interval. The method may further calculate a disparity frame based on the pair of camera frames, and obtain 3D information of the pair of camera frames based on the calculated disparity frame. The method may use a deep leaning model to determine an object area for auto-labeling, and may obtain 3D points based on the 3D information and the determined object area. And then, the method may re-project the 3D points towards the at least one DVS frame to generate re-projected points on the at least one DVS frame. The method may further generate at least one auto-labeled result on the at least one DVS frame by combining the re-projected points on the at least one DVS frame.

17 Claims, 5 Drawing Sheets

(51) Int. Cl.
     *G06V 10/25*       (2022.01)
     *G06V 10/60*       (2022.01)

(56)            References Cited

U.S. PATENT DOCUMENTS

| | | | |
|---|---|---|---|
| 2008/0298673 | A1 | 12/2008 | Zhang et al. |
| 2016/0096477 | A1 | 4/2016 | Biemer |
| 2018/0137673 | A1* | 5/2018 | Shi .......................... G06T 15/20 |
| 2018/0308253 | A1* | 10/2018 | Ryu .......................... G06T 7/38 |
| 2019/0295282 | A1* | 9/2019 | Smolyanskiy ........ G01S 13/867 |
| 2020/0005468 | A1 | 1/2020 | Paul et al. |
| 2020/0050893 | A1 | 2/2020 | Suresh et al. |
| 2021/0225035 | A1* | 7/2021 | Devitt ...................... G06T 7/50 |
| 2022/0222889 | A1* | 7/2022 | Bhargava ................. G06N 3/04 |
| 2023/0360254 | A1* | 11/2023 | Liu ........................ G06V 20/10 |

OTHER PUBLICATIONS

Gallego, G. et al., "Event-Based Vision: A Survey," IEEE Transactions on Pattern Analysis and Machine Intelligence, vol. 44, Jan. 2022, 27 pages.
European Patent Office, Extended European Search Report Issued in Application No. 21932255.9, Oct. 17, 2024, Germany, 9 pages.
ISA National Intellectual Property Administration of the People's Republic of China, International Search Report Issued in Application No. PCT/CN2021/083234, Dec. 30, 2021, WIPO, 2 pages.
Korean Intellectual Property Office, Office Action Issued in Application No. 10-2023-7029736, Jan. 2, 2026, 81 pages. (Submitted with Machine Translation).

\* cited by examiner

METHOD, APPARATUS AND SYSTEM FOR AUTO-LABELING

CROSS-REFERENCE TO RELATED APPLICATIONS

The present application is a U.S. National Phase of International Application No. PCT/CN2021/083234, entitled "METHOD, APPARATUS AND SYSTEM FOR AUTO-LABELING", and filed on Mar. 26, 2021. The entire contents of the above-listed application are hereby incorporated by reference for all purposes.

TECHNICAL FIELD

The present disclosure relates to a method, an apparatus and a system for auto-labeling, and specifically relates to a method, an apparatus and a system for auto-labeling DVS (Dynamic Vision Sensor) frame.

BACKGROUND

In recent years, the DVS which is a new cutting-edge sensor, has become widely known and used in many fields, such as artificial intelligence field, computer vision field, auto-driving field, robotics, etc.

Compared to the conventional camera, the DVS has advantages on low-latency, no motion blur, high dynamic range, and low power consumption. Particularly, the latency for DVS is in microsecond while the latency for conventional camera is in millisecond. Consequently, the DVS is not suffering from motion blur. And as a result, the data rate of DVS is usually 40~180 kB/s (for conventional camera, it is usually 10 mB/s), which means fewer bandwidth and fewer power consumption are needed. What's more, the dynamic range of DVS is about 120 dB while the dynamic range of conventional camera is about 60 dB. A wider dynamic range will be useful under extreme light conditions, for example, vehicle entering and exiting the tunnel, other vehicles in opposite direction turning on the high beam, sunshine direction changing, and so on.

Due to these advantages, DVS has been widely used. In order to apply DVS to different scenarios, efforts have been made. Among all the techniques, the deep learning is a popular and important direction. When talking about deep learning, huge amount of labeled data is a necessity. However, there might not be enough manual labors to label the data by hand. Thus, the auto-labeling for DVS frames is needed.

Currently, there are two auto-labeling approaches for DVS frame. One is to play a conventional camera video on a screen of a displaying monitor and use a DVS to record the screen and label the object. Another is, using deep learning model to directly generate labeled DVS frames from camera frames. However, these two approaches are both with insurmountable drawbacks. The first approach, loses precision, as when recording, it is hard to match 100% of the DVS frame exactly to the displaying monitor. The second approach will generate DVS frames which are unnatural. The reflection rate is different for different materials. But the second method treat them the same because the DVS frames are generated directly from camera frames, which thus makes the generated DVS frames very unnatural. What's more, both approaches will fall into problems of wasting the advantages of DVS, because the quality of camera video limits the final output of the generated DVS frames from the following aspect. First, the generated DVS frame rate would only reach the camera frame rate at most (although the second method could use up-scaling method to get more frames, but still, not promising). Second, the motion blur, after-image and smear, recorded by the camera, would also exist in the generated DVS frame. This fact is absurd and ridiculous, because the DVS is known for low-latency and no motion blur. Third, the high dynamic range of DVS is wasted, because conventional camera has low dynamic range.

Therefore, it is necessary to provide improved techniques to auto-label the DVS frame while sufficiently adopting the advantages of DVS.

SUMMARY

According to one or more embodiments of the disclosure, a method for auto-labeling dynamic vision sensor (DVS) frame is provided. The method may comprise receiving a pair of camera frames generated by a pair of cameras within an interval, and receiving at least one DVS frame generated by a DVS within the interval. The method may further calculate a disparity frame based on the pair of camera frames, and obtain 3D information of the pair of camera frames based on the calculated disparity frame. The method may use a deep leaning model to determine an object area for auto-labeling, and may obtain 3D points based on the obtained 3D information and the determined object area. Then, the method may re-project the 3D points towards the at least one DVS frame to generate re-projected points on the at least one DVS frame. The method may further generate at least one auto-labeled result on the at least one DVS frame by combining the re-projected points on the at least one DVS frame.

According to one or more embodiments of the disclosure, a system for auto-labeling dynamic vision sensor (DVS) frame is provided. The system may comprise a pair of cameras, a DVS and a computing device. The pair of cameras may be configured to generate a pair of camera frames within an interval. The DVS may be configured to generate at least one DVS frame within the interval. The computing device may comprise a processor and a memory unit storing instructions executable by the processor to: receive the pair of camera frames and the at least one DVS frame; calculate a disparity frame based on the pair of camera frames, and obtain 3D information of the pair of camera frames based on the calculated disparity frame; determine an object area for auto-labeling using a deep leaning model; obtain 3D points based on the obtained 3D information and the determined object area, and re-project the 3D points towards the at least one DVS frame to generate re-projected points on the at least one DVS frame; and generate at least one auto-labeled result on the at least one DVS frame by combining the re-projected points on the at least one DVS frame.

According to one or more embodiments of the disclosure, an apparatus for auto-labeling dynamic vision sensor (DVS) frame is provided. The apparatus may comprise a computing device which comprises a processor and a memory unit storing instructions executable by the processor to receive the pair of camera frames and the at least one DVS frame; calculate a disparity frame based on the pair of camera frames, and obtain 3D information of the pair of camera frames based on the calculated disparity frame; determine an object area for auto-labeling using a deep leaning model; obtain 3D points based on the obtained 3D information and the determined object area, and re-project the 3D points towards the at least one DVS frame to generate re-projected points on the at least one DVS frame; and generate at least one auto-labeled result on the at least one DVS frame by combining the re-projected points on the at least one DVS frame.

The method, apparatus and system described in the present disclosure may realize efficient and more accurate automatic labeling of DVS frames. The method, apparatus and system of the present disclosure may bind a pair of cameras with a DVS and simultaneously record the same scene. Based on the combined use of the obtained camera frame and the DVS frame, the DVS frames can be labeled automatically, at the same time while they are recorded. As a result, huge amount of labeled data for DVS deep learning training would be possible. Compared with the existing approaches, the method and system described in the present disclosure make full use of the advantages of DVS, and can obtain more accurate and efficient automatic labeling.

Figure 1:
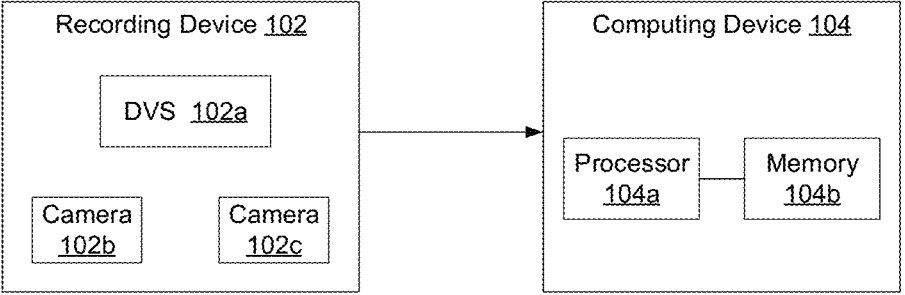
FIG. 1 illustrates a schematic diagram of the system of in accordance with one or more embodiments of the present disclosure.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION OF THE PREFERRED EMBODIMENTS

Examples will be provided below for illustration. The descriptions of the various examples will be presented for purposes of illustration, but are not intended to be exhaustive or limited to the embodiments disclosed. Many modifications and variations will be apparent to those of ordinary skill in the art without departing from the scope and spirit of the described embodiments.

In a general concept, the present disclosure provides a system, an apparatus and a method which may combine at least one pair of stereo cameras and a DVS together to auto-label the DVS frames. By using stereo cameras to calculate disparity and get the 3D information of the camera frames accordingly; using a deep learning model on camera frames to get the object area; re-projecting the 3D points corresponding to the object area, towards the DVS frame to generate points on the DVS frame; and combining re-projected points on the DVS frame to generate the final detection result on DVS frame, the system and method of this disclosure may provide reliable auto-labeled DVS frames because of the combined use of camera frames and DVS frames. Based on the combined use of the obtained camera frame and the DVS frame, the DVS frames can be labeled automatically at the same time while they are recorded. As a result, huge amount of labeled data for deep learning training of DVS would be possible. Compared with the existing approach, the method, apparatus and system described in the present disclosure make full use of the advantages of DVS, and can obtain more accurate and efficient automatic labeling.

FIG. 1 illustrates a schematic diagram of a system for auto-labeling DVS frame in accordance with one or more embodiments of the present disclosure. As shown in FIG. 1, the system may comprise a recording device 102 and a computer device 104. The recording device 102 may at least include, with no limitation, a DVS 102a and a pair of cameras 102b, 102c, e.g., a left camera 102b and a right camera 102c. According to the practice requirement, in addition to the left camera 102b and the right camera 102c, more cameras may be included in the recording device 102, without limitation. For simplicity, only one pair of camera are showed herein. The term of "camera" in this disclosure may include stereo camera. In the recording device 102, the pair of cameras 102b, 102c and the DVS 102a may be rigidly combined/assembled/integrated together. It should be understand that FIG. 1 is only to illustrate the components of the system, and is not intended to limit the positional relationship of system components. The DVS 102a can be arranged in any relative position relationship with the left camera 102b and the right camera 102c.

The DVS 102a may adopt an event-driven approach to capture dynamic changes in a scene and then create asynchronous pixels. Unlike the conventional camera, the DVS generates no images, but transmits pixel-level events. When there is a dynamic change in the real scene, the DVS will produce some pixel-level output (that is, an event). Thus, if there is no change, then there would be no data output. The dynamic change may include at least one of an intensity change and a movement of an object. The event data is in form of [x,y,t,p], in which x and y represents the coordinates of the pixels of the event in the 2D space, t is a time stamp of the event, and p is the polarity of the event. For example, the polarity of the event may represent a brightness change of the scene, such as becoming brighter (positive) or darker (negative).

The computing device 104 may be any form of devices that can perform computation, including without limitation, a mobile device, a smart device, a laptop computer, a tablet computer, an in-vehicle navigation system and so on. The computing device 104 may include, without limitation, a processor 104a. The processor 104a may be any technically feasible hardware unit configured to process data and execute software applications, including without limitation, a central processing unit (CPU), a microcontroller unit (MCU), an application specific integrated circuit (ASIC), a digital signal processor (DSP) chip and so forth. The computing device 104 may include, without limitation, and a memory unit 104*b* for storing data, code, instruction, etc., executable by the processor. The memory unit 104*b* may include, without limitation, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

The system for auto-labeling DVS frame may be positioned in an environment for operation. For example, the system may determine whether there is a dynamic change (event-based change) in a scene, and automatically activate the DVS and the pair of cameras to operate if the dynamic change in the scene is detected. The DVS and the pair of cameras may be synchronized by a synchronized time stamp. For the same scene, the left camera and the right camera may respective generate at least one left camera frame and at least one right camera frame during an interval. At the same time, the DVS may generate at least one DVS frame within the same interval. The number of the DVS frames is usually greater than the number of left or right camera frames because the timespan of the camera frame is greater than the timespan of the DVS frame. For example, the timespan of the camera frame is 20 ms, and the timespan of the DVS frame is 2 ms. For simple of explanation the principle of the present disclosure, the interval may be set as the same as the timespan of the camera frame, but not for limitation. In this case of setting the interval as the timespan of one camera frame, the left camera and the right camera may respectively generate a left camera frame and a right camera frame during an interval, and the DVS may generate at least one DVS frame within the same interval. The processor 104*a* may further perform the auto-labeling of the DVS frame based on the generated left and right camera frames, which will be detailed described in reference to FIG. 2-FIG. 9.

Figure 2:
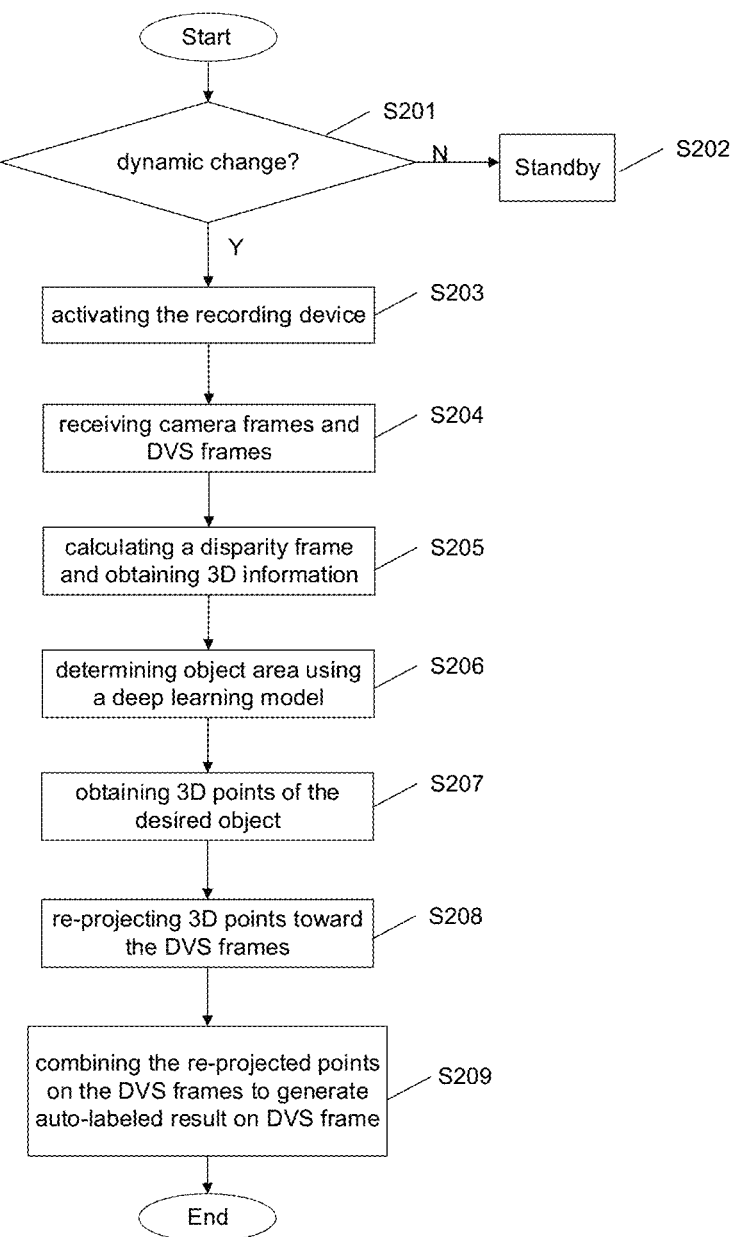
FIG. 2 illustrates a method flowchart in accordance with one or more embodiments of the present disclosure.

FIG. 2 illustrates a method flowchart in reference to the system shown in FIG. 1 in accordance with another one or more embodiments of the present disclosure. As shown in FIG. 2, at S201, a determination of whether there is a dynamic change in the scene may be performed. If it is determined that there is not a dynamic change, then goes to S202. At S202, the system may be in a standby state. If it is determined that there is a dynamic change, the method then goes to S203. At S203, the recording device 102 is activated which means the cameras and the DVS may operate to respectively generate camera frames and DVS frames. It should be understand that S201-S203 may be omitted, and the method flow may directly start from S204.

At S204, a pair of camera frames generated by a pair camera and at least one DVS frame generated by a DVS may be received. For example, the left camera 102*b* and the right camera 102*c* may respectively generate a left camera frame and a right camera frame within the interval. At the same time, the DVS 102*a* may generate at least one DVS frame.

Further, at S205, a disparity frame could be calculated based on the left and right camera frames, and then, 3D information of the left and right of camera frames may be obtained based on the calculated disparity frame. The 3D information may comprise 3D points, each of the 3D points represents a space location or 3D coordinates corresponding to each pixel within the left and the right camera frames.

Figure 3:
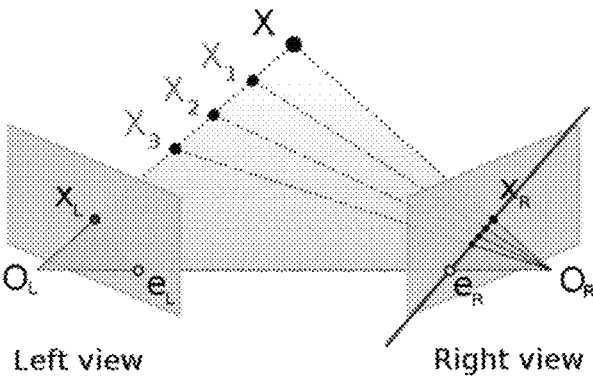
FIG. 3 illustrates a principle of the disparity in accordance with one or more embodiments of the present disclosure.

For example, a triangulation may be used to get the 3D information of the camera frames, and the SGBM (Semi-Global Block Matching) method may be used to calculate the disparity of stereo camera frames. The concept of "disparity" will be depicted as follows. The term 'disparity' can be understood as 'binocular disparity', which means 'the difference in image location of an object seen by the left and right eyes, resulting from the eyes' horizontal separation (parallax)'. In computer vision, it means the pixel-level correspondences/matching pairs between left sensor/camera and right sensor/camera, as described in FIG. 3. In reference to FIG. 3, the disparity refers to the distance between two corresponding points in the left and right image of a stereo pair. FIG. 3 illustrates different 3D points X, X1, X2 and X3 result in different projection positions on the left image and the right image, wherein OL represents the optical center of left camera and OR represents the optical center of right camera. The line between OL and OR is a baseline; el represents the intersection point of the left image plane and the baseline, and er represents the intersection point of the right image plane and the baseline.

Taking point X as an example, by following the dotted line from X to OL, the intersection point with the left image plane is at XL. The same principal is applied to the right image plane. By following the dotted line from X to OR, the intersection point with the right image plane is at XR. That means, point X projects to the point XL in the left camera frame and to the point XR in the right camera frame, then the disparity of the pixel in the frame can be calculated as the difference between XL and XR. Accordingly, by performing the abovesaid calculation for each pixel in the frame, the disparity frame may be obtained based on the left camera frame and the right camera frame.

Figure 4:
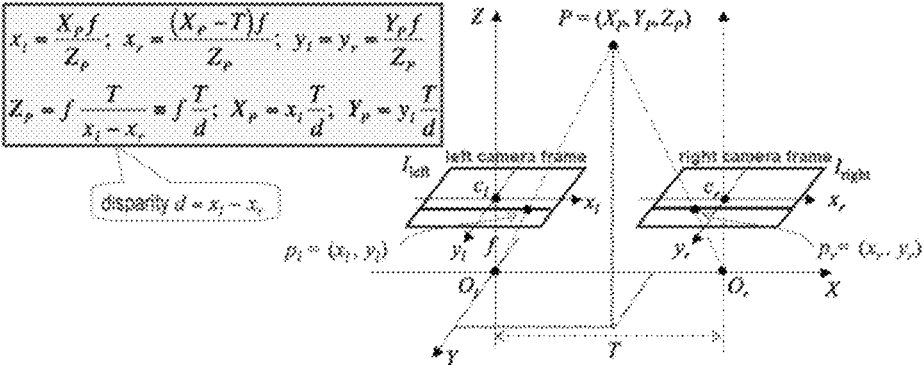
FIG. 4 illustrates a relationship between the disparity and the depth information and in accordance with one or more embodiments of the present disclosure.
Figure 7:
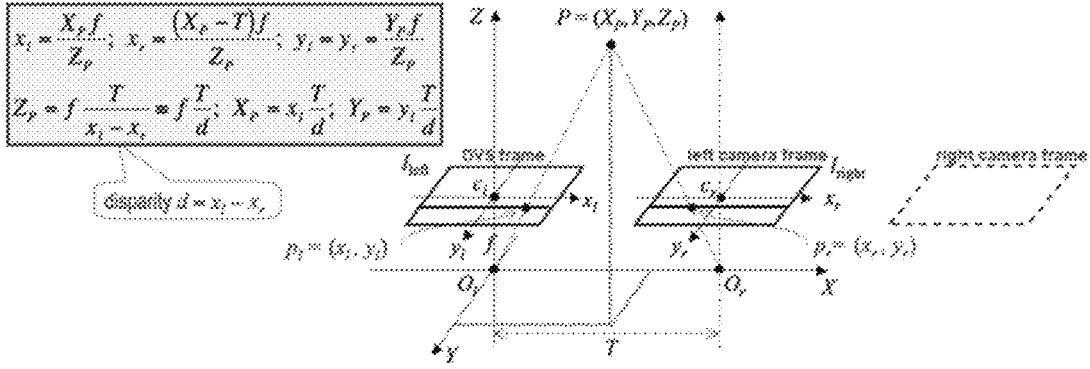
FIG. 7 illustrates an example of re-projecting of 3D points towards the DVS frame in accordance with one or more embodiments of the present disclosure.

FIG. 4 describes the relationship between the disparity and the depth information of each pixel. Now in reference to FIG. 4, how to obtain 3D information of the camera frames based on the disparity will be illustrated. FIG. 4 shows a 3D point P (Xp, Yp, Zp), a left camera frame and a right camera frame. The 3D point projects to the left camera frame at point pl(x1,y1) and projects to the right camera frame at point pr(xr,yr). O1 represents the optical center of left camera and Or represents the optical center of right camera. O1 represents the center of left camera frame and Or represents the center of right camera frame. The line between OL and OR is a baseline. T represents the distance from OL to OR. The parameter f represents the focal length of the camera, the parameter d represents the disparity which is equal to the difference between x1 and xr. The translation between the points P and the points pl and pr respectively in the left camera frame and the right camera frame may be defined by the following formulas (1)-(2), which are also shown in FIG. 4 and FIG. 7.

$$Z_p = f\frac{T}{x_l - x_r} = f\frac{T}{d}; X_p = x_l\frac{T}{d}; Y_p = y_l\frac{T}{d} \tag{1}$$

$$x_l = \frac{X_p f}{Z_p}; x_r = \frac{(X_p - T)f}{Z_p}; y_l = y_r = \frac{Y_p f}{Z_p} \tag{2}$$

According to the above disparity-to-depth equations, the position of each pixel in the left camera frame and the right camera frame can be translated to each 3D point. Thus, based on the disparity frame, 3D information of the left and right camera frames can be obtained.

Figure 5:
FIG. 5 illustrates an example of a disparity frame calculated from a left camera and a right camera in accordance with one or more embodiments of the present disclosure.

In order to facilitate understanding, FIG. 5 shows from left to right, respectively the left camera frame, the right camera frame, and the disparity frame which is calculated from the left camera frame and the right camera frame. For the disparity frame, a lighter colored pixel means a closer distance and a darker colored pixel means a farther distance.

Figure 6:
FIG. 6 illustrates an example of object detection result on the left camera and the disparity frame in accordance with one or more embodiments of the present disclosure.

Back to the method flowchart, at S206, an object area for auto-labeling may be determined by using a deep leaning model. According to different requirements, various deep learning model which may extract features of target, without limitation, may be applied to one camera frame selected from the left and right camera frames. For example, an object detection model may be applied to one camera frame. Different models may provide different forms of output. For example, some models may output the object area representing a contour of the desired object, wherein the contour consists of points of the desired object. For example, other models may output the object area representing an area where the desired object is located, such as a rectangular area. FIG. 6 shows one example only for illustration but not for limitation, wherein the camera frame may be the same camera frame showed in FIG. 5. As shown in FIG. 6, for example, the left camera frame is selected. The object detection result on left camera frame is showed, for example, as the rectangle result, and the corresponding result on the disparity frame is also showed as the rectangle result in the disparity frame.

Then, at S207, based on the 3D information obtained at S205 and the object area determined at S206, 3D points of the desired object in the object area are obtained. As described in reference to S206, different models may output detection result in different forms. If the detection result is the contour of the desired object consisting of points, then it is possible to directly use it to get the 3D points from the 3D information obtained in S205. If the detection result is an area where the desired objected is located, such as a rectangular result, then a clustering process need to be performed. That is, the points which take the most part of the detection rectangle, and the points which are closer to the center of the detection rectangle, would be considered as the desired object.

At S208, the obtained 3D points of the desired object may be re-projected towards the at least one DVS frame. Since the stereo cameras and the DVS are in the same world coordinates, and they are rigidly combined together, the 3D points calculated from the stereo camera frames are also the 3D points seen from the DVS frame. Thus, a re-projecting process could be made to re-projects the 3D points of the desired object, towards the DVS frame. It can be understood that the triangulation and the re-projection could be seen as inverse processes with each other. The key here is to use the two stereo camera frames to get the 3D points, and use one camera frame and one DVS frame to get the matching points on the DVS frame. FIG. 7 shows the re-projection of 3D point P(Xp, Yp, Zp) towards the DVS frame. The parallelogram drawn by dashed line refers to the right camera frame in previous FIG. 4. The parameters in FIG. 7 have the same definition as that in FIG. 4. As shown in FIG. 7, the formula is the same as formula in FIG. 4. The only difference is, in FIG. 4, the two frames are stereo camera frames, while in FIG. 7, the two frames are one camera frame and one DVS frame.

Figure 8:
FIG. 8 illustrates an example result in accordance with one or more embodiments of the present disclosure.
Figure 9:
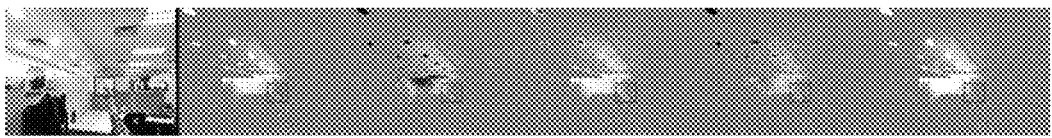
FIG. 9 illustrates another example result in accordance with one or more embodiments of the present disclosure.

At S209, the re-projected points on the DVS frame may be combined, to generate the new detection result on DVS frame, i.e., generated the auto-labeled DVS frame. After re-projecting the 3D points of the desired object to get the locations of points on the DVS frame, it is possible to get the corresponding detection result on DVS frame. For example, if it needs a rectangular result, then a rectangle is made to include all the re-projected points on the DVS frame. For example, if it needs a contour result, then the re-projected points on the DVS frame are each connected to its closest point one by one, among all points. As described by the example shown in FIG. 8, the auto-labeled result would be generated by using the re-projected points on the DVS frame. FIG. 8 shows the example of the expected effect of the final result. The left image in FIG. 8 is the left camera frame, the right image is the DVS frame. The dots on the right image refers to the positions of the re-projected 3D points on the DVS frame. The rectangle is the auto-labeled result on DVS frame. FIG. 8 is simply for an illustration, and in real cases, there would be much more re-projected points on the DVS frame.

By using the above method of auto-labeling, one camera frame could be used to label many DVS frames because the FPS (Frames Per Second) of DVS is much higher than conventional camera, which may further improve the efficiency of auto-labeling. FIG. 10 shows one camera frame and its corresponding auto-labeled DVS frames. These DVS frames are consecutive frames.

The method, apparatus and system described in the present disclosure may realize more efficient and accurate automatic labeling of DVS frames. The method, apparatus and system of the present disclosure bind a pair of cameras with a DVS and simultaneously record the same scene. Based on the combined use of the obtained camera frame and the DVS frame, the DVS frames can be labeled automatically, at the same time while they are recorded. As a result, huge amount of labeled data for DVS deep learning training would be possible. Compared with the existing approach, the method, apparatus and system described in the present disclosure make full use of the advantages of DVS, and can perform more accurate and efficient automatic labeling.

1. In some embodiments, a method for auto-labeling dynamic vision sensor (DVS) frames, the method comprising: receiving a pair of camera frames generated by a pair of cameras within an interval, and receiving at least one DVS frame generated by a DVS within the interval; calculating a disparity frame based on the pair of camera frames, and obtaining 3D information of the pair of camera frames based on the calculated disparity frame; determining an object area for auto-labeling using a deep leaning model; obtaining 3D points based on the obtained 3D information and the determined object area, and re-projecting the 3D points towards the at least one DVS frame to generate re-projected points on the at least one DVS frame; and generating at least one auto-labeled result on the at least one DVS frame by combining the re-projected points on the at least one DVS frame.

2. The method according to clause 1, further comprising: wherein the pair of cameras includes a left camera and a right camera; wherein the DVS is arranged to rigidly combine with the left camera and the right camera.

3. The method according to any one of clauses 1-2, wherein the determining an object area for auto-labeling further comprising: selecting one camera frame from the pair of camera frames as an input of a deep learning model, and determining an object area for auto-labeling based on the output of the deep leaning model.

4. The method according to any one of clauses 1-3, wherein the 3D information comprises 3D points, each of the 3D points represents a space location/coordinate corresponding to each pixel within one camera frame.

5. The method according to any one of clauses 1-4, wherein the interval is predetermined based on a timespan between two consecutive camera frames.

6. The method according to any one of clauses 1-5, the generating at least one DVS frame by the DVS within the interval comprising: integrating pixel events within the interval to generate the at least one DVS frame.

7. The method according to any one of clauses 1-6, further comprising: determining whether there is a dynamic change in a scene; and activating the DVS and the pair of cameras if there is a dynamic change in the scene.

8. The method according to any one of clauses 1-7, wherein the dynamic change includes at least one of an intensity change and a movement of an object.

9. In some embodiments, a system for auto-labeling dynamic vision sensor (DVS) frames comprising: a pair of cameras configured to generate a pair of camera frames within an interval; a DVS configured to generate at least one DVS frame within the interval; and a computing device comprising a processor and a memory unit storing instructions executable by the processor to: calculate a disparity frame based on the pair of camera frames, and obtain 3D information of the pair of camera frames based on the calculated disparity frame; determine an object area for auto-labeling using a deep leaning model; obtain 3D points based on the obtained 3D information and the determined object area, and re-project the 3D points towards the at least one DVS frame to generate re-projected points on the at least one DVS frame; and generate at least one auto-labeled result on the at least one DVS frame by combining the re-projected points on the at least one DVS frame.

10. The system according to clause 9, wherein the pair of cameras comprises a left camera and a right camera, and wherein the DVS is arranged to rigidly combine with the left camera and the right camera.

11. The system according to any one of clauses 9-10, wherein the processor is further configured to: select one camera frame from the pair of camera frames as an input of a deep learning model, and determine an object area for auto-labeling based on the output of the deep leaning model.

12. The system according to any one of clauses 9-11, wherein the 3D information comprises 3D points, each of the 3D points represents a space location/coordinate corresponding to each pixel within the camera frames.

13. The system according to any one of clauses 9-12, wherein the at least one DVS frame is generated by integrating pixel events within the interval.

14. The system according to any one of clauses 9-13, wherein the interval is predetermined based on a timespan between two consecutive camera frames.

15. The system according to any one of clauses 9-14, wherein the processor is further configured to: determine whether there is a dynamic change in a scene; and activate the DVS and the pair of cameras if there is a dynamic change in the scene.

16. The system according to any one of clauses 9-15, wherein the dynamic change includes at least one of an intensity change and a movement of an object.

17. In some embodiments, an apparatus for auto-labeling dynamic vision sensor (DVS) frames comprising: a computing device comprising a processor and a memory unit storing instructions executable by the processor to: receive a pair of camera frames generated by a pair of cameras within an interval, and receive at least one DVS frame generated by a DVS within the interval; calculate a disparity frame based on the pair of camera frames, and obtain 3D information of the pair of camera frames based on the calculated disparity frame; determine an object area for auto-labeling using a deep leaning model; obtain 3D points based on the obtained 3D information and the determined object area, and re-project the 3D points towards the at least one DVS frame to generate re-projected points on the at least one DVS frame; and generate at least one auto-labeled result on the at least one DVS frame by combining the re-projected points on the at least one DVS frame.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference sign is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

While the foregoing is directed to embodiments of the present disclosure, other and further embodiments of the disclosure may be devised without departing from the basic scope thereof, and the scope thereof is determined by the claims that follow.

What is claimed is:

1. A method for auto-labeling dynamic vision sensor (DVS) frames, the method comprising:
    receiving a pair of camera frames generated by a pair of cameras within an interval, and receiving at least one DVS frame generated by a DVS within the interval, wherein the pair of cameras includes a left camera and a right camera, and wherein the DVS is rigidly combined with the left camera and the right camera such that the DVS and the pair of cameras share a common world coordinate system;
    calculating a disparity frame based on the pair of camera frames, and obtaining 3D information of the pair of camera frames based on the calculated disparity frame;
    determining an object area for auto-labeling using a deep learning model;
    obtaining 3D points based on the obtained 3D information and the determined object area, and re-projecting the 3D points towards the at least one DVS frame to generate re-projected points on the at least one DVS frame; and
    generating at least one auto-labeled result on the at least one DVS frame by combining the re-projected points on the at least one DVS frame.

2. The method according to claim 1, wherein the pair of cameras and the DVS are synchronized by a synchronized time stamp.

3. The method according to claim 1, wherein the determining an object area for auto-labeling further comprising:
    selecting one camera frame from the pair of camera frames as an input of the deep learning model, and
    determining an object area for auto-labeling based on an output of the deep learning model.

4. The method according to claim 1, wherein the 3D information comprises 3D points, each of the 3D points represents a space location/coordinate corresponding to each pixel within one camera frame.

5. The method according to claim 1, wherein the interval is predetermined based on a timespan between two consecutive camera frames.

6. The method according to claim 1, wherein the at least one DVS frame is generated by integrating pixel events within the interval.

7. The method according to claim 1, further comprising:
    determining whether there is a dynamic change in a scene; and
    activating the DVS and the pair of cameras if there is a dynamic change in the scene.

8. The method according to claim 7, wherein the dynamic change includes at least one of an intensity change and a movement of an object.

9. A system for auto-labeling dynamic vision sensor (DVS) frames comprising:

a pair of cameras configured to generate a pair of camera frames within an interval, wherein the pair of cameras includes a left camera and a right camera;
    a DVS configured to generate at least one DVS frame within the interval, wherein the DVS is rigidly combined with the left camera and the right camera such that the DVS and the pair of cameras share a common world coordinate system; and
    a computing device comprising a processor and a memory unit storing instructions executable by the processor to:
        calculate a disparity frame based on the pair of camera frames, and obtain 3D information of the pair of camera frames based on the calculated disparity frame;
        determine an object area for auto-labeling using a deep learning model;
        obtain 3D points based on the obtained 3D information and the determined object area, and re-project the 3D points towards the at least one DVS frame to generate re-projected points on the at least one DVS frame; and
        generate at least one auto-labeled result on the at least one DVS frame by combining the re-projected points on the at least one DVS frame.

10. The system according to claim 9, wherein:
    the pair of camera and the DVS are configured to simultaneously record a same scene within the interval; and
    the computing device is further configured to generate the at least one auto-labeled result on the at least one DVS frame in real-time during capture of the at least one DVS frame.

11. The system according to claim 9, wherein the processor is further configured to:
    select one camera frame from the pair of camera frames as an input of the deep learning model, and
    determine an object area for auto-labeling based on an output of the deep learning model.

12. The system according to claim 9, wherein the 3D information comprises 3D points, each of the 3D points represents a space location/coordinate corresponding to each pixel within the camera frames.

13. The system according to claim 9, wherein the at least one DVS frame is generated by integrating pixel events within the interval.

14. The system according to claim 9, wherein the interval is predetermined based on a timespan between two consecutive camera frames.

15. The system according to claim 9, wherein the processor is further configured to:
    determine whether there is a dynamic change in a scene; and
    activate the DVS and the pair of cameras if there is a dynamic change in the scene.

16. The system according to claim 15, wherein the dynamic change includes at least one of an intensity change and a movement of an object.

17. An apparatus for auto-labeling dynamic vision sensor (DVS) frames comprising:
    a computing device comprising a processor and a memory unit instructions executable by the processor to:
        receive a pair of camera frames generated by a pair of cameras within an interval, and receive at least one DVS frame generated by a DVS within the interval, wherein the pair of cameras includes a left camera and a right camera, and wherein the DVS is rigidly combined with the left camera and the right camera such that the DVS and the pair of cameras share a common world coordinate system;

calculate a disparity frame based on the pair of camera frames, and obtain 3D information of the pair of camera frames based on the calculated disparity frame;

determine an object area for auto-labeling using a deep learning model;

obtain 3D points based on the obtained 3D information and the determined object area, and re-project the 3D points towards the at least one DVS frame to generate re-projected points on the at least one DVS frame; and generate at least one auto-labeled result on the at least one DVS frame by combining the re-projected points on the at least one DVS frame.

\* \* \* \* \*